United States Patent [19]

Hiyane

[11] Patent Number: 4,697,472
[45] Date of Patent: Oct. 6, 1987

[54] MULTI-ARTICULATED ROBOT

[75] Inventor: Masao Hiyane, Yokohama, Japan

[73] Assignee: Fujitsu Limited, Kawasaki, Japan

[21] Appl. No.: 535,837

[22] Filed: Sep. 26, 1983

[30] Foreign Application Priority Data

Sep. 25, 1982 [JP] Japan .................................. 57-165982
Sep. 27, 1982 [JP] Japan .................................. 57-166722

[51] Int. Cl.⁴ ........................ B25J 17/00; F16H 29/20
[52] U.S. Cl. ..................................... 74/479; 74/89.15;
74/89.22; 403/12; 403/119; 901/24; 901/25;
901/26; 901/28
[58] Field of Search .................... 414/729; 901/27, 28,
901/19, 21, 46, 30, 29, 23, 24, 25, 26, 31;
403/119, 331, 12, 1; 74/89.15, 89.22, 89.2, 469,
479

[56] References Cited

U.S. PATENT DOCUMENTS

| | | | |
|---|---|---|---|
| 3,614,898 | 10/1971 | Paine ................................... | 74/89.15 |
| 4,089,427 | 5/1978 | Pardo et al. ........................ | 901/27 X |
| 4,225,191 | 9/1980 | Knoski ................................ | 403/12 X |
| 4,312,622 | 1/1982 | Favareto ............................. | 901/26 X |
| 4,356,378 | 10/1982 | Cloos et al. ....................... | 901/29 X |
| 4,389,561 | 6/1983 | Weman et al. ..................... | 901/46 X |
| 4,441,376 | 4/1984 | Tobey ................................. | 74/89.15 |
| 4,488,241 | 12/1984 | Hutchins et al. .................. | 901/30 X |

FOREIGN PATENT DOCUMENTS

| | | | |
|---|---|---|---|
| 0000877 | 3/1979 | European Pat. Off. . | |
| 0072786 | 2/1983 | European Pat. Off. .............. | 901/21 |
| 2345856 | 3/1975 | Fed. Rep. of Germany . | |
| 2639143 | 3/1977 | Fed. Rep. of Germany ........ | 901/21 |
| 2754609 | 6/1979 | Fed. Rep. of Germany ........ | 901/19 |
| 779411 | 7/1957 | United Kingdom ................ | 403/331 |
| 1455782 | 11/1976 | United Kingdom ................. | 901/19 |
| 2053148 | 7/1979 | United Kingdom . | |
| 2036376 | 6/1980 | United Kingdom ................. | 901/46 |
| 766855 | 10/1980 | U.S.S.R. ............................... | 901/28 |

Primary Examiner—Leslie J. Paperner
Attorney, Agent, or Firm—Staas & Halsey

[57] ABSTRACT

A multi-articulated robot for providing a plurality of articulations. The robot has a plurality of articulation units, with each unit including a drive and has connecting portions disposed at both ends of the drive for connection with the other articulation units.

11 Claims, 18 Drawing Figures

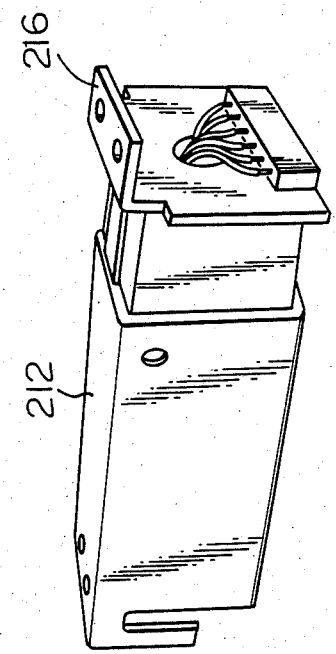
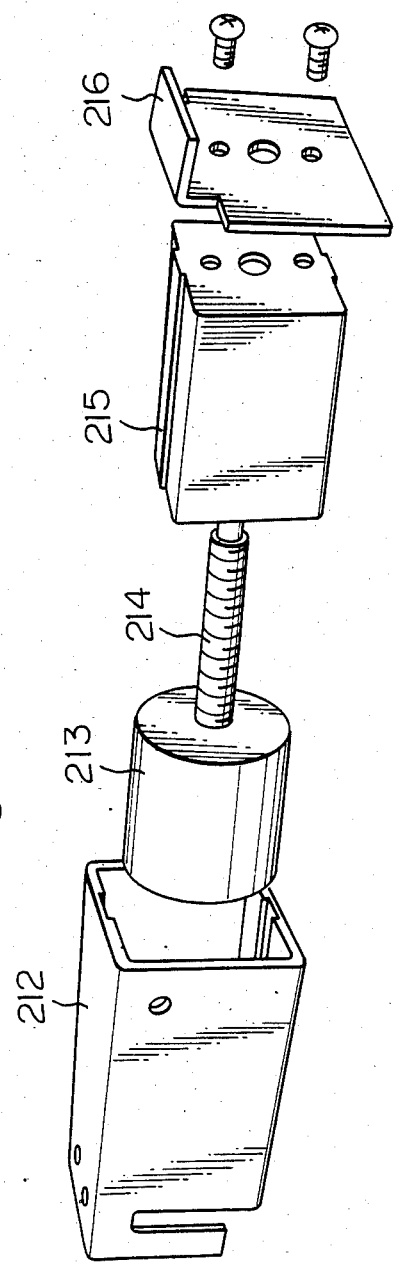
Fig. 8
Fig. 9

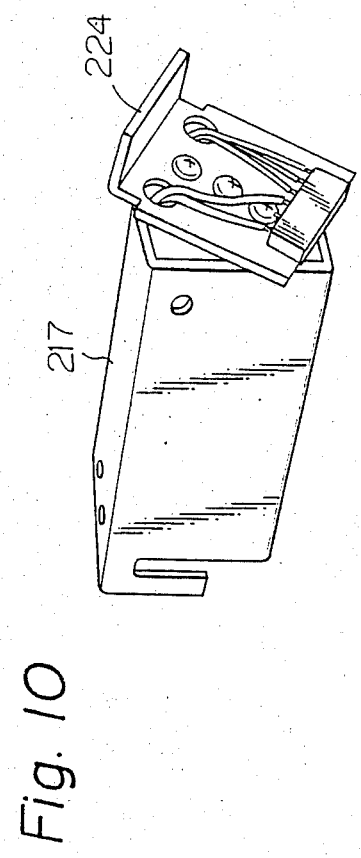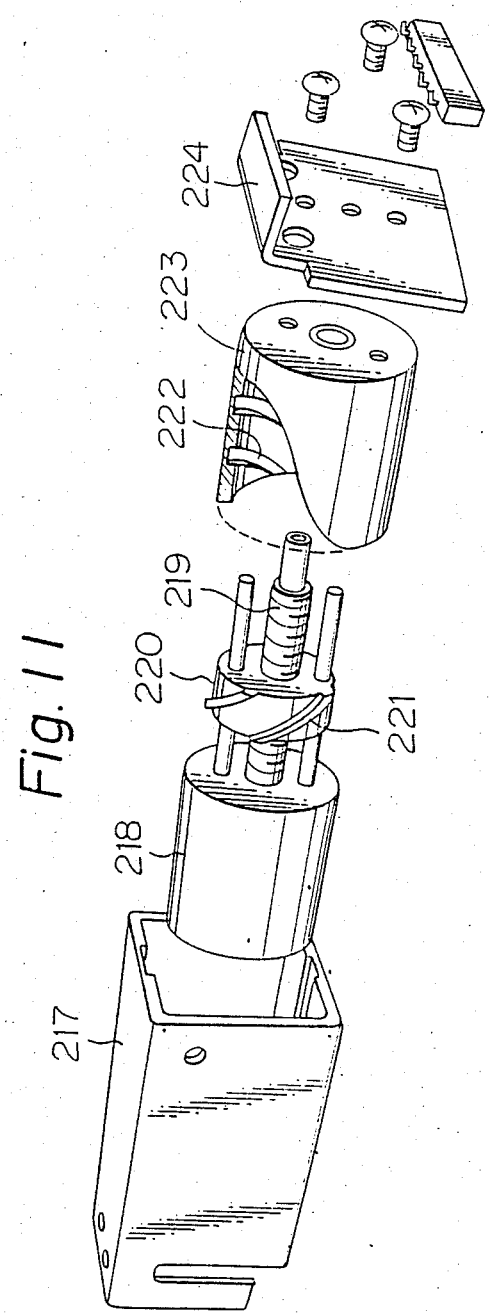
Fig. 10
Fig. 11

MULTI-ARTICULATED ROBOT

BACKGROUND OF THE INVENTION

The present invention relates to an industrial robot, especially to a multi-articulated robot comprising an arm or a hand involving a plurality of articulations.

Nowadays an industrial robot is used for automatic production and for the elimination of labor in various manufacturing fields. Such a robot comprises a multi-articulated arm or hand which can effect a complicated productional movement. Each articulation of the arm or hand rotates, articulates, expands, and contracts, thereby enabling the robot to accomplish a desired operation.

The conventional industrial robot is usually designed and constituted as one integral body and the drive force is transmitted by transmission means to the end part thereof which part must be light in weight. The movement of the arm or hand is controlled by the drive in accordance with the operation of the robot. If changing of the operation of the robot is desired, the entire arm or hand, including the drive thereof, must be replaced. Also, it is necessary to change the shape, size, and function of each articulation, the drive, and the number of articulations. Therefore, it is not easy to change the operation of the robot.

SUMMARY OF THE INVENTION

The present invention eliminates the above drawbacks of the prior art. A purpose of the present invention is to provide a mutli-articulated robot which can be easily assembled and in which the number of articulations or the operations thereof can be easily changed.

In order to achieve the above purpose, there is provided a multi-articulated robot comprising a plurality of articulations, characterized in that the robot comprises a plurality of articulation units, each of which comprises a drive means and has connecting portions disposed at both ends thereof for connection with the other articulation units.

BRIEF DESCRIPTION OF THE DRAWINGS

FIG. 8 is a perspective view of yet another articulation unit according to the present invention.

FIG. 9 is a disassembled view of the articulation unit of FIG. 8.

FIG. 10 is a perspective view of still another articulation unit according to the present invention.

FIG. 11 is a disassembled view of the articulation unit of FIG. 10.

DESCRIPTION OF THE PREFERRED EMBODIMENTS

Figure 1:
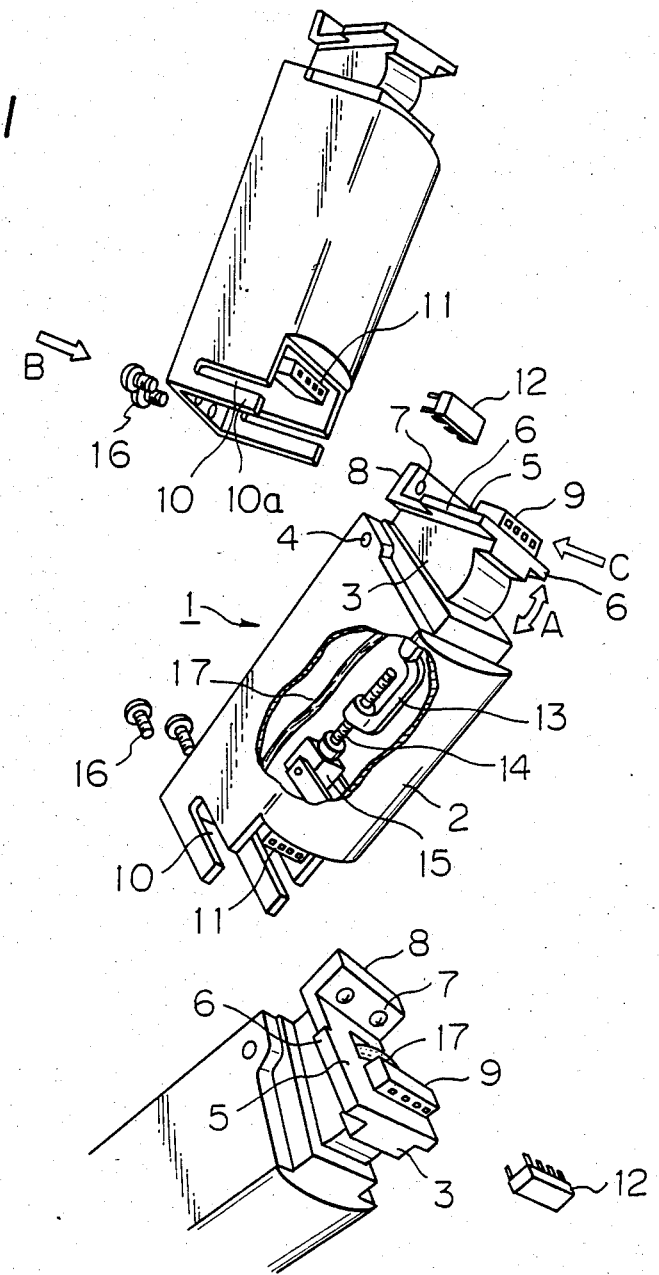
FIG. 1 is a disassembled view of an articulation unit according to the present invention.

An example of the articulation unit in accordance with the present invention is illustrated in FIG. 1. The articulation unit 1 comprises a body 2 and a connection member 3 which is rotatable about an axis 4 disposed at the upper end of the body 2. The connection member 3 comprises projections 6 at both sides thereof and a folded tongue 8 at the rear end thereof. Screw holes 7 are formed in the folded tongue 8. A connector 9 for electrically interconnecting articulation units is secured to the upper connection surface 5 of the connection member 3. A guide groove 10 for receiving the projection 6 of the connection member 3 is formed at the lower end of each side of the body 2. Also, a connector 11 to be connected to the connector 9 is disposed at the lower end of the body 2. The connectors 9 and 11 are interconnected by a short plug 12. The insertion direction of the short plug 12 is parallel with the connection surface 5, as is shown by the arrow C. The connection member 3 is connected to a motor 15 via a linkage 13 and a screw bar 14 which is screwed into the linkage 13. The screw bar 14 rotates when the motor 15 is driven, with the result that the linkage 13 moves along the screw bar 14 and thereby the connection member 3 is rotated about the axis 4, as is illustrated by the arrows A, so as to articulate the assembled articulation units. The projection 6 of the connection member 3 is pushingly inserted into the guide groove 10 against the resiliency of a guide piece 10a which defines the lower part of the guide groove 10. Therefore, the projection 6 is securely held within the guide groove 10 after it is inserted thereinto. Then the two articulation units are firmly interconnected with screws 16. The screwing direction of the screws 16 is parallel with the connection surface 5, as is shown by the arrow B. Cables 17, which are connected to the connectors 9 and 11, and the motor 15 are disposed within the body 2.

Figure 2:
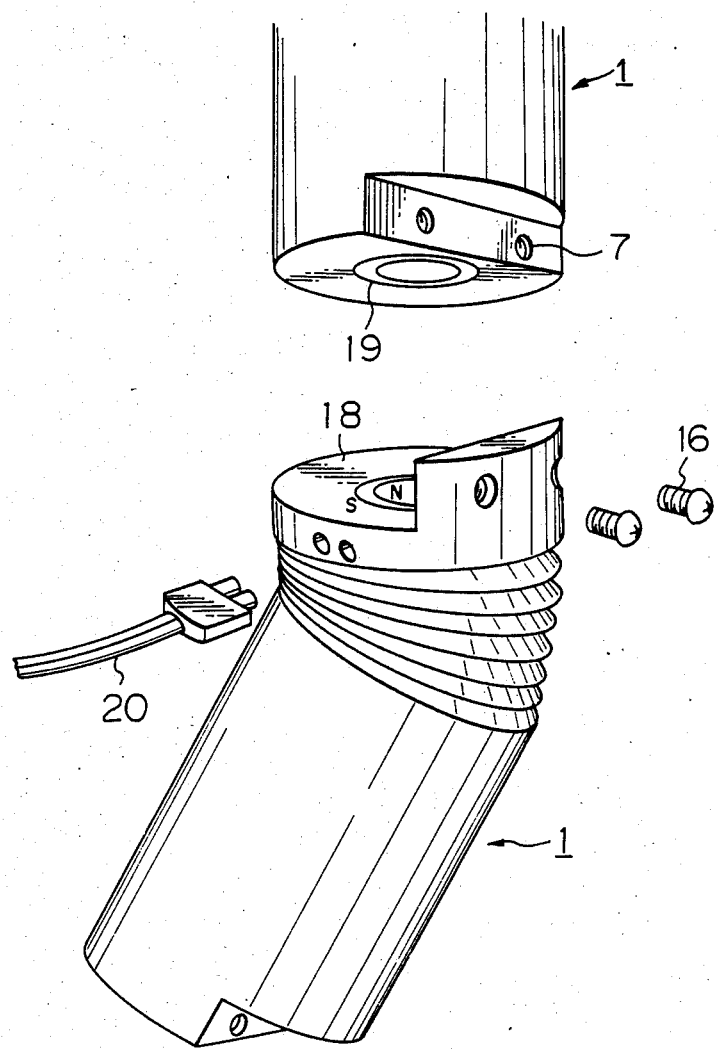
FIG. 2 is a disassembled view of another articulation unit according to the present invention.

Another example of the articulation unit 1 in accordance with the present invention is illustrated in FIG. 2. This articulation unit 1 comprises a magnet 18 at the upper end thereof and a ferromagnetic material 19, such as iron, at the lower end thereof. The articulation units 1 are first connected by the magnetic force of the magnet 18. Then the articulation units 1 are firmly interconnected with screws 16. Reference numeral 20 designates a plug for actuating a coil (not shown) which weakens the force of the magnet 18 when the articulation units 1 are disassembled. Other structures and functions of the articulation units are substantially the same as those of the example of FIG. 1.

Figure 3:
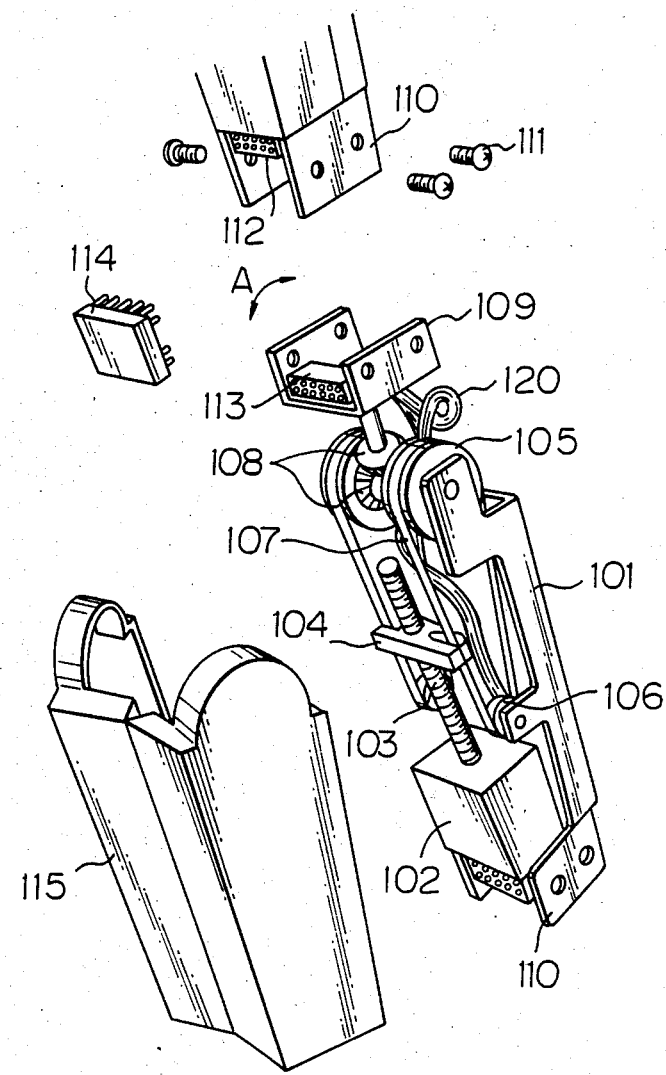
FIG. 3 is a disassembled view of still another articulation unit according to the present invention.

FIG. 3 is a disassembled view of another articulation unit in accordance with the present invention. A motor 102 is installed in a body 101, and a screw bar 103 is connected to the output of the motor 102. A nut member 104 is screwed onto the screw bar 103 so that the nut member 104 moves along the screw bar 103 in accordance with the rotation of the screw bar 103. Two endless belts 107, each of which engages pulleys 105 and 106, are secured to the nut member 104. The pulley 105 is connected to a connection member 109 via bevel gears 108. Cables 120 of power lines and signal lines are disposed in the body 101. The cables 120 are of a sufficient length to enable smooth movement of the connection member 109. A connector 113, to which the cables 120 are connected, is secured to the upper surface of the connection member 109. The connector 113 is connected, via a short plug 114, to a connector 112 disposed at the lower end of a second articulation unit to be assembled with a first (the above-mentioned) articulation unit. The articulation units are interconnected in such a manner that an attaching piece 110 formed at the lower end of the body 101 can be secured with screws 111 to the connection member 109 formed at the upper end of the first articulation unit to be interconnected with the second articulation unit. The body 101 is covered by a cover 115. When the motor 102 is driven, the pulleys 105 and 106 are rotated via the nut member 104 and the endless belts 107. Thereby, the connection member 109 articulates via the bevel gears 108.

The rotation of the pulleys 105 and 106 may be directly transmitted to the connection member 109 so that the connection member 109 swings, as is shown by the arrows A, thereby obviating the necessity of the bevel gears 108.

Figure 4:
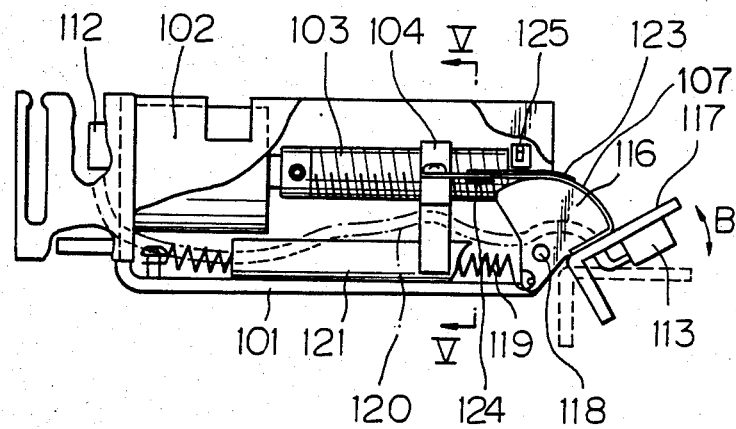
FIG. 4 is a side view of yet another articulation unit according to the present invention.
Figure 5:
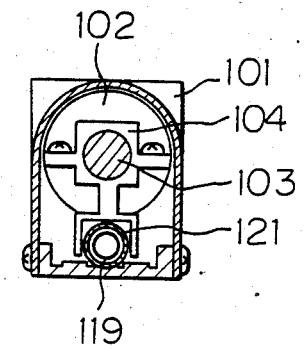
FIG. 5 is a sectional view of the articulation unit of FIG. 4 along line V—V of FIG. 4.

Another example of the articulation unit in accordance with the present invention is illustrated in FIGS. 4 and 5. A motor 102 is installed in a body 101, and a screw bar 103 is connected to the output of the motor 102. A nut member 104 is screwed onto the screw bar 103, and a belt 107 is secured to the nut member 104. The belt 107 engages a sector member 116 which is rotatable about an axis 118. Similar to the example of FIG. 3, the motor 102 actuates the sector member 116 via the screw bar 103, the nut member 104, and the belt 107 so that a connection member 117 secured to the sector member 116 articulates as is shown by the arrows B. A spring 119 is disposed within the body 101 so as to restore the sector member 116 to its original position. The backlash of the screw bar 103 and the sector member 116 is absorbed by the spring 119. The spring 119 is covered by a sleeve 121, which prevents the cables 120 from becoming entangled with the spring 119. The sleeve 121 also guides the nut member 104 and prevents the rotation thereof.

Figure 6:
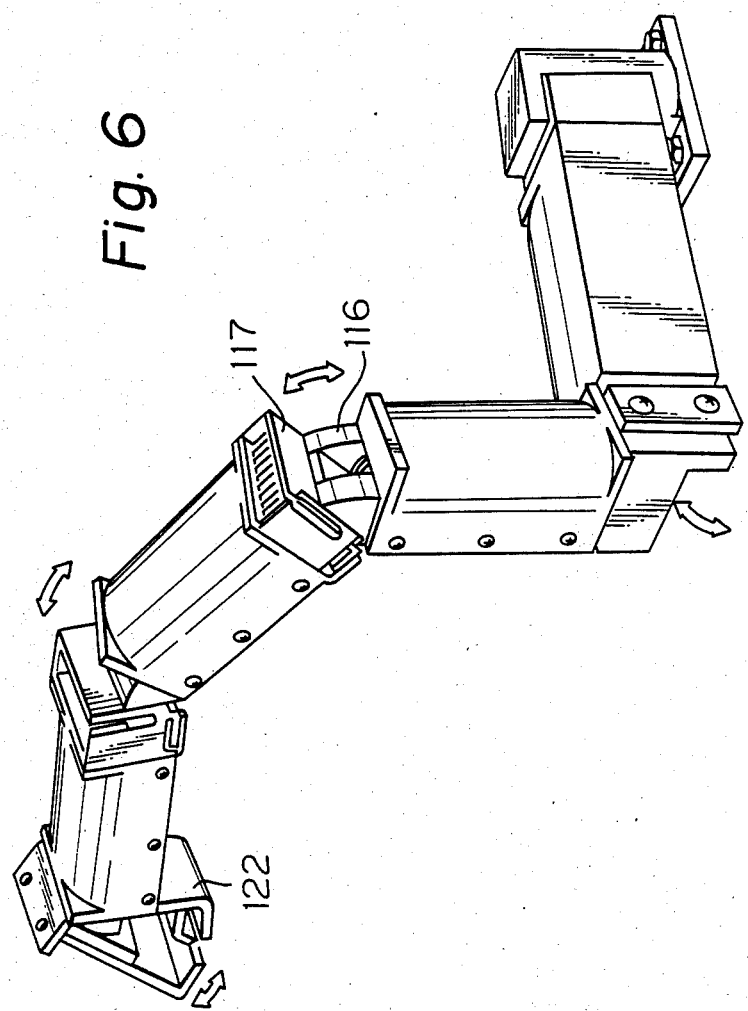
FIG. 6 is a perspective view of a robot comprising a plurality of articulation units, each unit being of the type of FIG. 4.

A plurality of the above-mentioned articulation units are assembled so as to constitute a multi-articulated robot arm having a hand 122 at the end thereof, as is illustrated in FIG. 6. A strain gauge 124 (FIG. 4) may be attached to the belt 107 so as to detect the force applied to the articulation. Also, magnetic tape 123 (FIG. 4) may be attached to the belt 107 so as to form a position detection means in cooperation with a magnetic sensor 125 (FIG. 4) secured to the body 101.

Figure 7:
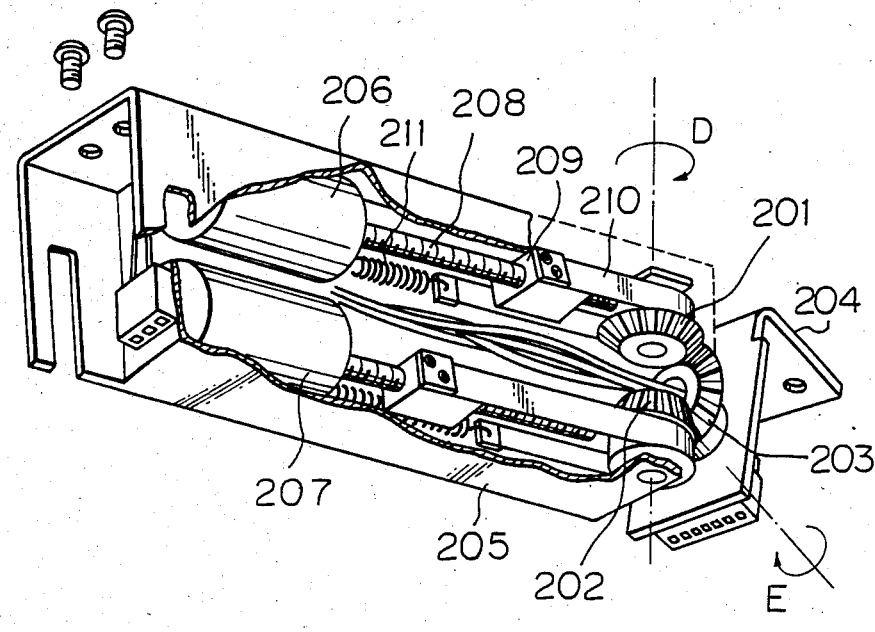
FIG. 7 is a perspective view of still another articulation unit according to the present invention.

Another example of the articulation unit in accordance with the present invention is illustrated in FIG. 7. This articulation unit comprises a bevel gear-transmission means comprising bevel gears 201 and 202 and a bevel gear 203 with which the bevel gears 201 and 202 engage. A connection member, to which the bevel gear 203 is connected, is rotatable about the axis of the bevel gears 201 and 202, as is shown by the arrow D, and about the axis of the bevel gear 203, as is shown by the arrow E, with respect to the body 205 of the articulation unit. The bevel gears 201 and 202 are independently driven by motors 206 and 207, respectively. A screw bar 208 is connected to the motor 206. A nut member 209 is screwed onto the screw bar 208 so that the nut member 209 moves along the screw bar 208 in accordance with the rotation of the screw bar 208. One end of a belt 210 is secured to the nut member 209 and the other end is connected to a spring 211, which is secured to the body 205. A bevel gear 201 rotates, via the belt 210, due to the movement of the nut member 209. The bevel gear 202 is rotated by the motor 207 in a manner similar to the rotation of the bevel gear 201.

An extensible articulation unit is illustrated in FIGS. 8 and 9. The articulation unit comprises a body 212, a motor 213 installed within the body 212, a screw bar 214 connected to the motor 213, and a nut member 215 screwed onto the screw bar 214 so as to move along the screw bar 214 in accordance with the rotation of the screw bar 214. The articulation unit expands and contracts, in accordance with the movement of the connection member 216 secured to the nut member 215, along the longitudinal axis of the body 212, the movement of the connection member 216 being due to the rotation of the motor 213.

A rotatable articulation unit is illustrated in FIGS. 10 and 11. The articulation unit comprises a body 217, a motor 218 installed within the body 217, a screw bar 219 connected to the motor 218, and a nut member 220 movable along the screw bar 219 in accordance with the rotation of the screw bar 219. Screw threads 221 of a large lead are formed on the nut member 220. A cylinder 223 comprising inner threads 222 which engage with the outer threads 221 of the nut member 220 is mounted on the nut member 220. The cylindrical member 223 is held by an appropriate means to prevent linear motion along, but to allow rotation about, the axis thereof. Thus the right end of the screw bar 219 as illustrated in FIG. 11 rotates in the hole shown in the middle of the end-cap at the right side of the threaded cylinder 223, thanks to the securing provided by the middle screw shown at the far right which is screwed into the indicated hole in the end of the screw bar 219 via the respective illustrated hole in the connection member 2. When the motor 218 is rotated, the nut member 220 moves along the screw bar 219 so that the cylinder 223 rotates about the longitudinal axis thereof along with the connection member 224 attached thereto. A large torque can be obtained by transmitting the rotational force from the motor to the cylinder via the nut member instead of directly transmitting the rotational force from the motor to the cylinder.

A robot arm for performing a desired movement can be constructed by appropriately assembling various types of the above-mentioned articulation units.

Figure 12:
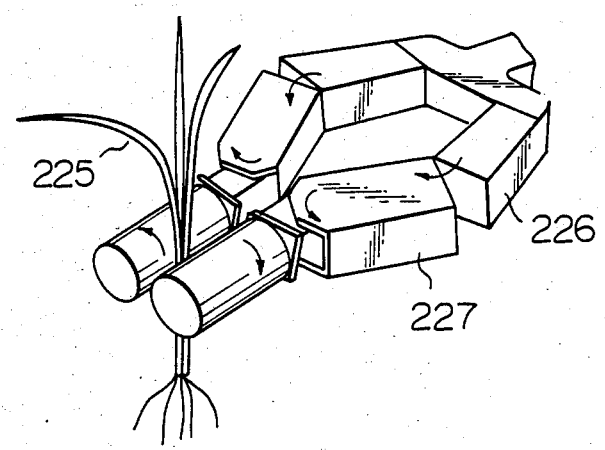
FIG. 12 is a perspective view of a robot arm in accordance with the present invention.

As example of the articulated robot arm in accordance with the present invention is illustrated in FIG. 12. The robot arm of FIG. 12 comprises articulation units 226 and 227 and performs the operation of pulling grass 225. The rotatable and foldable articulation unit of FIG. 7 or the rotatable articulation unit of FIG. 11 may be used as the articulation unit 227 of this robot. The foldable articulation unit of FIG. 1, 2, or 3 may be used as the articulation unit 226.

Figure 13:
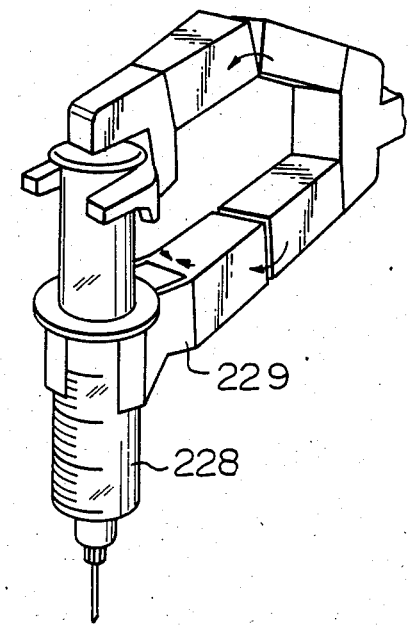
FIG. 13 is a perspective view of another robot arm in accordance with the present invention.
Figure 14:
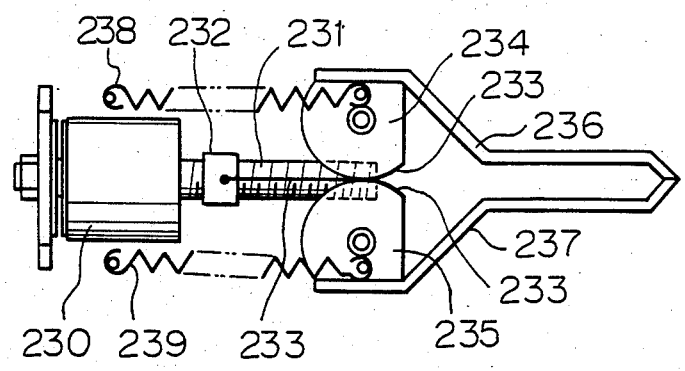
FIG. 14 is a constructional view of the hand of the robot of FIG. 13, with the hand being closed.
Figure 15:
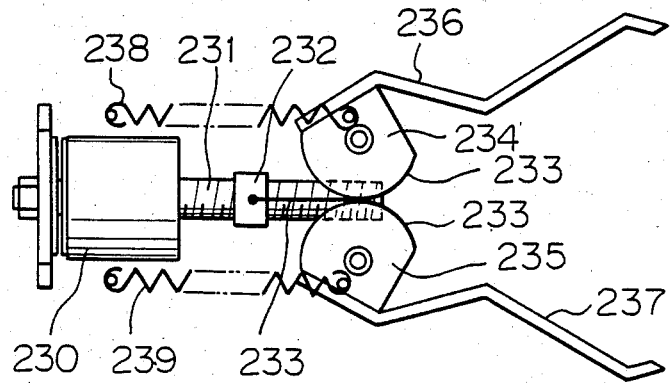
FIG. 15 is a constructional view of the hand of FIG. 14, with the hand being open.

Another example of the articulated robot arm in accordance with the present invention is illustrated in FIG. 13. The robot arm of FIG. 13 performs the operation of manipulating an injector 228. The injector 228 is grasped by a hand 229. An example of the construction of such a hand 229 is illustrated in FIGS. 14 and 15. A screw bar 231 is connected to the output of a motor 230, and a nut member 232 is arranged on the screw bar 231 so that it moves along the screw bar 231 when the screw bar 231 rotates. One end of each of two superposed belts 233 is secured to the nut member 232 and the other end is secured to rollers 234 and 235. FIGS. 236 and 237 are secured to the rollers 234 and 235, respectively. Spring 238 and 239 engage the rollers 234 and 235, respectively, so as to open the fingers 236 and 237, respectively. When the motor 230 is driven so that the nut member 232 moves forward (rightward), the fingers 236 and 237 are opened due to the force of the springs 238 and 239, respectively, as is illustrated in FIG. 15. When the motor 230 is reversely rotated so that the nut member 232 moves backward (leftward), the fingers 236 and 237 close, as is illustrated in FIG. 14.

Figure 16:
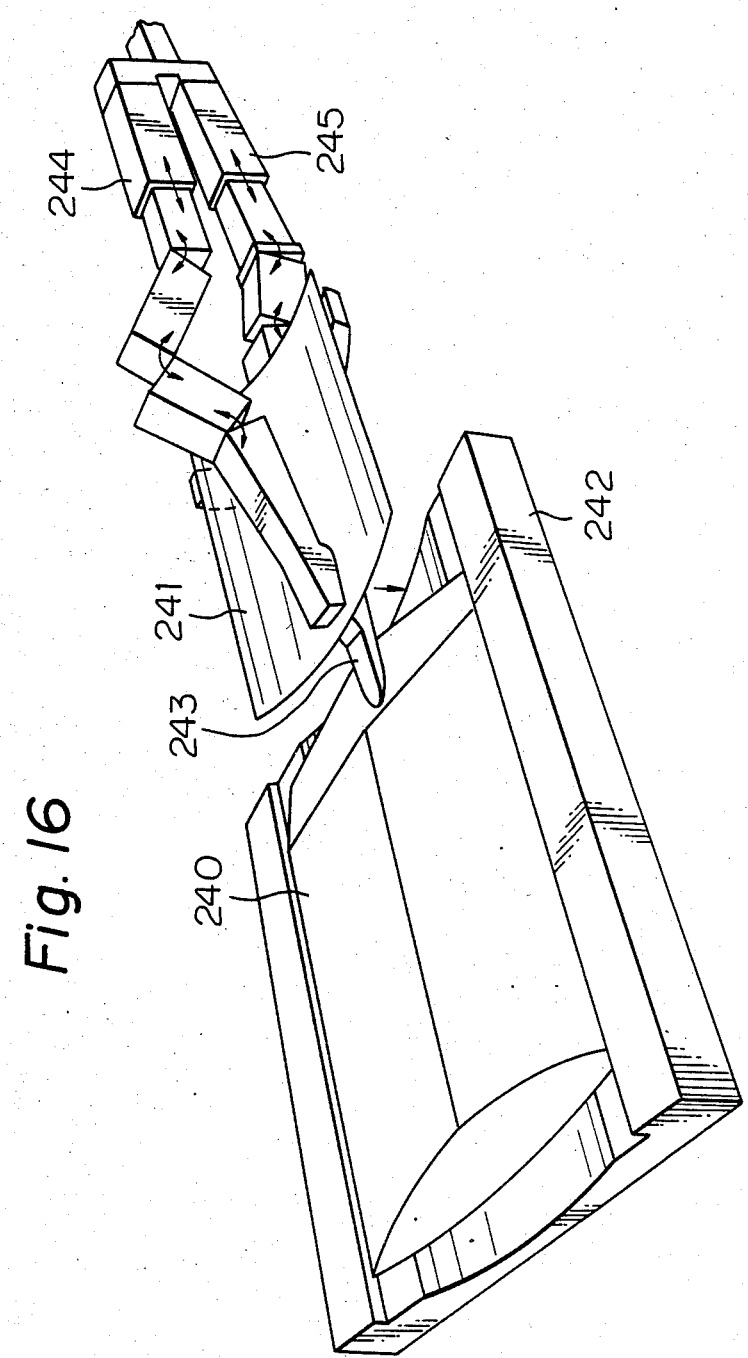
FIG. 16 is a perspective view of still another robot arm in accordance with the present invention.

Another example of the articulated robot arm in accordance with the present invention is illustrated in FIG. 16. The robot arm of FIG. 16 performs the operation of inserting a piece of paper into an envelope. An envelope 240 is placed on a support 242, and a handpiece 243 of the robot pushes down the flap of the envelope and opens the envelope. Then a piece of paper 241 is inserted into the envelope by the extensible articulation units 244 and 245.

Figure 17:
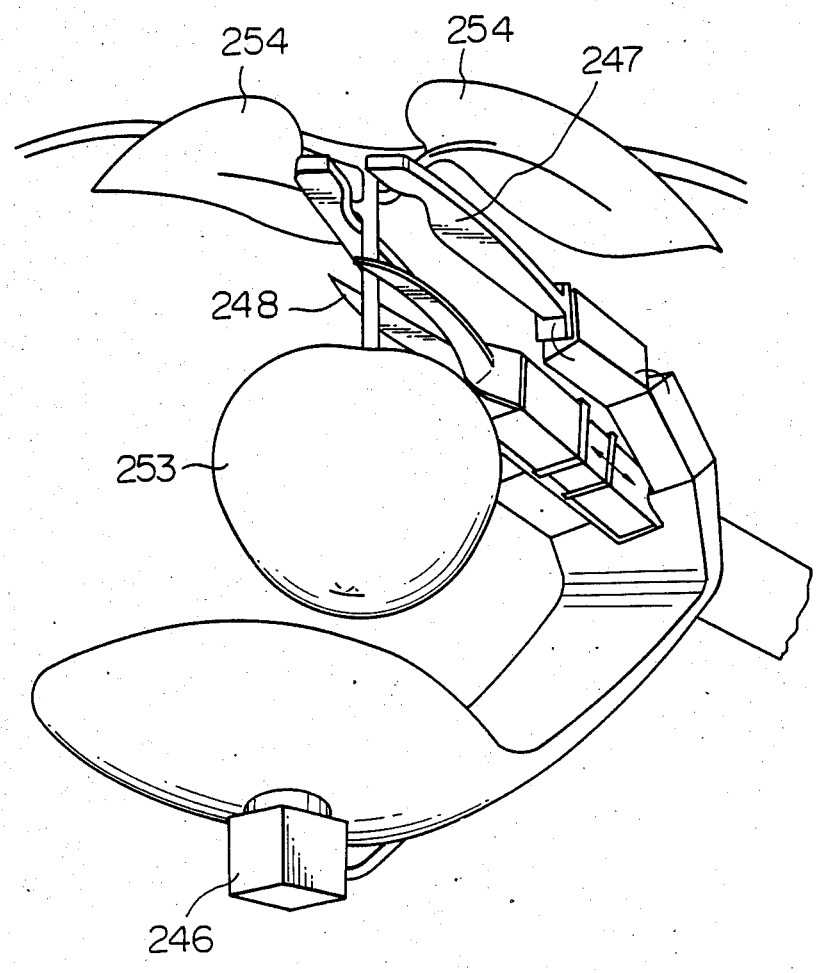
FIG. 17 is a perspective view of yet another robot arm in accordance with the present invention.

Another example of the articulated robot arm in accordance with the present invention is illustrated in FIG. 17. The robot arm of FIG. 17 performs the operation of picking fruit. A piece of fruit 253 is detected by a detector 246, the leaves 254 are forced upward by the handpieces 247, and the stem 248 is cut with scissors 248.

Figure 18:
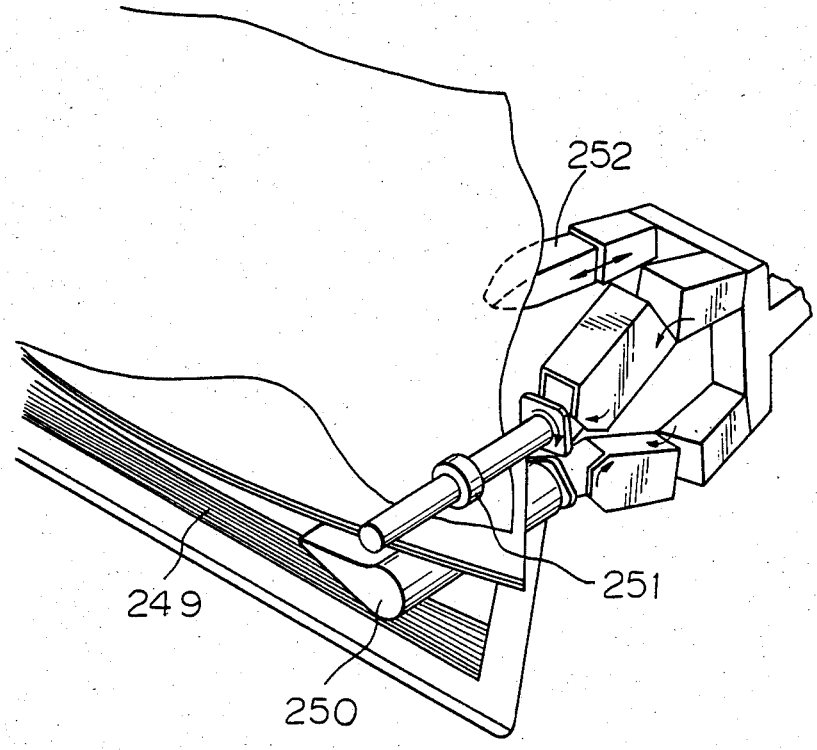
FIG. 18 is a perspective view of still another robot arm in accordance with the present invention.

Another example of the articulated robot arm in accordance with the present invention is illustrated in FIG. 18. The robot arm of FIG. 18 performs the operation of turning the pages of a book. A wedge 250 is inserted into a book 249. The uppermost page is separated from the other pages by a rubber roller 251. Then a handpiece 252 is inserted into the gap beneath the uppermost page and turns the uppermost page over.

As was mentioned above, the multi-articulated robot in accordance with the present invention comprises a plurality of articulation units, each of which comprises an independent drive means and performs a desired movement. Therefore, by appropriately selecting and assembling the articulation units, a robot for performing a desired operation can be easily obtained. Also, the number of articulations can be easily increased or decreased, and the operation of the robot can be easily changed.

As was previously mentioned, with reference to FIGS. 1 and 2, the insertion direction of screws which interconnect the articulation units is parallel with the connection surface between the articulation units, i.e., substantially perpendicular to the longitudinal axis of each articulation unit, and the insertion direction of the projection of the connection member into the guide groove is also parallel with the connection surface. Further, the insertion direction of the short plug for electrically interconnecting the articulation units is also parallel with the connection surface between the articulation units. Therefore, there is no force component in the longitudinal direction of each articulation unit, thereby making it possible to prevent damaging of the internal structure of the articulation unit due to the force for combining the articulation units.

Also, as was previously mentioned, with reference to FIGS. 3, 4, and 5, the screw movement in connection with the motor is converted to an articulation movement via the belt and the rotatable member which engages the belt. The rotational angle of the motor precisely corresponds to the rotational angle of the articulation unit. Therefore, accurate control of the articulation movement can be easily achieved. Also, detectors for detecting the force applied to the articulation unit and the angular position of the articulation unit can be easily attached thereto so that the force, position, and acceleration of the articulation unit can be easily detected, thereby achieving accurate control of the robot arm.

What is claimed is:
1. A multi-articulated robot for providing a plurality of articulations, comprising a plurality of articulation units, wherein:
 each of said articulation units comprises a drive means and has a connecting portion disposed at least at one end of the articulation unit for connection with one of said connecting portions of at least one other respective one of the articulation units;
 the respective connecting portions each have a coupling surface at which the respective articulation units are combined together, and are constructed so that the direction of relative movement for connecting said articulation units together is constrained to be substantially parallel to said coupling surfaces of said articulations; and
 connection means for interconnecting said articulation units is provided at said connecting portion, said connection means being arranged in a manner such that said articulation units are interconnected by a force having a direction that is substantially parallel to said coupling surfaces.

2. A multi-articulated robot as set forth in claim 1, wherein said drive means of at least one of said articulation means comprises a motor, a screw bar rotated by said motor and a movable member screwed onto said screw bar and movable along said screw bar.

3. A multi-articulated robot as set forth in claim 2, wherein said at least one drive means comprises a belt for connecting said movable member to a respective one of said engages said belt.

4. A multi-articulated robot as set forth in claim 3, comprising a sensor for detecting at least one of (1) the force applied to said articulation units and (2) the movement of at least one of said articulation units attached to said belt.

5. The robot of claim 1, wherein the connecting portion of a first one of two of said articulation units that are connected to each other includes projections, and the connecting portion of the respective end of the second one of said two connected articulation units includes guide grooves into which said projections are inserted, wherein said projection and guide grooves are such that the direction of inserting said projections in the respective guide grooves is substantially perpendicular to the longitudinal axes of the respective articulation units.

6. The robot of claim 5, each said connecting portion of each of said two connected articulation units having a respective connection surface, wherein each said connection surface is substantially parallel with said direction of inserting.

7. The robot of claim 1, wherein said connecting portions of said connected articulation units have respective connection surfaces, and said connection surfaces are substantially perpendicular to the longitudinal axis of the respective connected articulation units during at least a portion of the movement provided by the connected articulation units.

8. A multi-articulated robot as set forth in claim 1, comprising fasteners for holding together said at least two connected articulation units, said fasteners having an axis along which said fasteners are moved to secure together the connected articulation units, said axis being parallel to the respective coupling surfaces of the connected articulation units.

9. A multi-articulated robot as set forth in claim 1 comprising an electrical connector for providing power to the respective drive means, located in the vicinity of the respective coupling surface, and a third connector for connecting between said two connectors located in the vicinity of the end of each said articulation unit, wherein the direction of insertion of said third connector is in a direction parallel to said coupling surfaces.

10. A multi-articulated robot for providing a plurality of articulations, comprising a plurality of articulation units, wherein each of said articulation units comprises a drive means and has a connecting portion disposed at least at one end of the articulation unit for connection with one of said connecting portions of at least one other of the articulation units, wherein at least one of said drive means comprises a motor, a screw bar rotated by said motor and a single movable member screwed onto said screw bar and movable along said screw bar, said single movable member being interconnected to said connecting portion so that said connecting portion moves in response to the movement of said single movable member, wherein said movable member comprises a cylindrical nut which is threaded on its outer surface, and said cylindrical nut is interconnected with said connecting portion through a cylinder member the interior of which is threaded for enaging said threaded outer surface of said nut.

11. A multi-articulated robot for providing a plurality of articulations, comprising a plurality of articulation units, each said articulation unit having a connecting portion disposed at least at one end of the articulation unit for connection with the connecting portion of another of said articulation units and a magnetic force means for presecuring said connecting portions of the connected articulation units, each said connecting portion of said two connected articulation units having a connecting surface which contacts the connecting surface of the other, said connected articulation units being fastened together by fasteners inserted along an axis in a direction substantially parallel to said connecting surfaces, and means for weakening the magnetic force of said magnetic force means for disassembling said articulation units when said fasteners are not fastening said articulation units.

* * * * *